United States Patent
Zhang

(10) Patent No.: US 10,224,029 B2
(45) Date of Patent: Mar. 5, 2019

(54) METHOD FOR USING VOICEPRINT IDENTIFICATION TO OPERATE VOICE RECOGNITION AND ELECTRONIC DEVICE THEREOF

(71) Applicant: VIA Technologies, Inc., New Taipei (TW)

(72) Inventor: Guo-Feng Zhang, Shanghai (CN)

(73) Assignee: VIA TECHNOLOGIES, INC., New Taipei (TW)

(*) Notice: Subject to any disclaimer, the term of this patent is extended or adjusted under 35 U.S.C. 154(b) by 170 days.

(21) Appl. No.: 14/248,345

(22) Filed: Apr. 9, 2014

(65) Prior Publication Data

US 2015/0019222 A1 Jan. 15, 2015

(30) Foreign Application Priority Data

Jul. 9, 2013 (TW) .................. 201310285509 A

(51) Int. Cl.
*G10L 15/20* (2006.01)
*G10L 17/00* (2013.01)
*G10L 21/0208* (2013.01)

(52) U.S. Cl.
CPC ............ *G10L 15/20* (2013.01); *G10L 17/005* (2013.01); *G10L 2021/02087* (2013.01)

(58) Field of Classification Search
CPC ..... G10L 15/265; G10L 17/005; G10L 17/02; G10L 17/04; G10L 17/06; G07C 9/00071
See application file for complete search history.

(56) References Cited

U.S. PATENT DOCUMENTS

| 2005/0096900 A1* | 5/2005 | Bossemeyer ........... G10L 25/48 704/219 |
| 2008/0215324 A1* | 9/2008 | Hirohata ...................... 704/246 |
| 2013/0317827 A1* | 11/2013 | Fu et al. ...................... 704/273 |

FOREIGN PATENT DOCUMENTS

| CN | 102723081 | 10/2012 |
| EP | 2608201 | 6/2013 |
| TW | I342010 | 5/2011 |
| TW | 201240423 | 10/2012 |

OTHER PUBLICATIONS

Jurafsky and Martin, "Speech and Language Processing: An introduction to natural language processing, computational linguistics, and speech recognition," Prentice Hall PTR Upper Saddle River, 2007, pp. 1-1037.
"Office Action of Taiwan Counterpart Application", dated Apr. 27, 2015, p. 1-p. 4, in which the listed references were cited.

* cited by examiner

Primary Examiner — Richa Mishra
(74) Attorney, Agent, or Firm — JCIPRNET

(57) ABSTRACT

A method for using voiceprint identification to operate voice recognition and electronic device thereof are provided. The method includes the following steps: receiving a specific voice fragment; cutting the received specific voice fragment into a plurality of specific sub-voice clips; performing a voiceprint identification flow to the specific sub-voice clips, respectively; determining whether each of the specific sub-voice clips is an appropriate sub-voice clip according to a result of the voiceprint identification flow; and capturing the appropriate sub-voice clips and operating a voice recognition thereto.

6 Claims, 5 Drawing Sheets

METHOD FOR USING VOICEPRINT IDENTIFICATION TO OPERATE VOICE RECOGNITION AND ELECTRONIC DEVICE THEREOF

CROSS-REFERENCE TO RELATED APPLICATION

This application claims the priority benefit of China application serial no. 201310285509.0, filed on Jul. 9, 2013. The entirety of the above-mentioned patent application is hereby incorporated by reference herein and made a part of this specification.

BACKGROUND OF THE INVENTION

Field of the Invention

The invention relates to a method for voice recognition and an electronic device thereof, and more particularly, to a method for using voiceprint identification to operate voice recognition and an electronic device thereof.

Description of Related Art

In conventional technology, most of electronic devices such as cell phones, notebook computers and tablet computers are included with a voice recognition module. A user can control an electronic device to perform various commands by voice. However, when it comes to process a voice conversation input by the user, due to interference from external noise, the voice recognition module can easily mistakenly use sounds other than the voice conversation input by the user for identification, resulting an increasing recognition error rate. Accordingly, how to improve correctness of the recognition rate for the voice conversation input by the user has become an important issue to be discussed in the field of voice recognition.

SUMMARY OF THE INVENTION

The invention provides a method for using voiceprint identification to operate voice recognition. The method includes the following steps: receiving a specific voice fragment; cutting the received specific voice fragment into a plurality of specific sub-voice clips; performing a voiceprint identification flow to the specific sub-voice clips, respectively; determining whether each of the specific sub-voice clips is an appropriate sub-voice clip according to a result of performing the voiceprint identification flow to the specific sub-voice clips. Next, the appropriate sub-voice clips are captured and the voice recognition is operated thereto.

According to an embodiment of the invention, in the step of determining whether each of the specific sub-voice clips is the appropriate sub-voice clip according to the result of performing the voiceprint identification flow to the specific sub-voice clips, further includes the following steps. Based on a time sequence, the specific sub-voice clips are defined into a first sub-voice clip, a second sub-voice clip and a third sub-voice clip to a Nth sub-voice clip, wherein N is an amount of the specific sub-voice clips. Next, the first sub-voice clip, the second sub-voice clip and the third sub-voice clip are recognized through the voiceprint identification flow. When the first sub-voice clip, the second sub-voice clip and the third sub-voice clip are recognized as an identical specific user voice through the voiceprint identification flow, it is recognized that whether the fourth sub-voice clip to the Nth sub-voice clip are also the identical specific user voice. When it is recognized that one or more sub-voice clips among the fourth sub-voice clip to the Nth sub-voice clip are also the identical specific user voice, it is determined that the one or more sub-voice clips being the identical specific user voice are the appropriate sub-voice clips.

According to an embodiment of the invention, in the step of recognizing whether the fourth sub-voice clip to the Nth sub-voice clip are also the identical specific user voice, further includes the following steps. When it is determined that the one or more sub-voice clips among the fourth sub-voice clip to the Nth sub-voice clip are not the identical specific user voice, it is determined that the one or more sub-voice clips not being the identical specific user voice are inappropriate sub-voice clips. Next, the inappropriate sub-voice clips are abandoned without operating the voice recognition thereto.

According to an embodiment of the invention, in the step of determining whether each of the specific sub-voice clips is the appropriate sub-voice clip according to the result of performing the voiceprint identification flow to the specific sub-voice clips, further includes the following steps. A preset voiceprint identification data is stored in a database. When it is determined that the one or more sub-voice clips among the specific sub-voice clips match the preset voiceprint identification data, it is determined that the one or more sub-voice clips matching the preset voiceprint identification data are the appropriate sub-voice clips. Next, the voice recognition is operated to the appropriate sub-voice clips.

According to an embodiment of the invention, in the step of determining whether each of the specific sub-voice clips is the appropriate sub-voice clip according to the result of performing the voiceprint identification flow to the specific sub-voice clips, further includes the following steps. When it is determined that the one or more sub-voice clips among the specific sub-voice clips mismatch the preset voiceprint identification data, it is determined that the one or more sub-voice clips mismatching the preset voiceprint identification data are inappropriate sub-voice clips. Next, the inappropriate sub-voice clips are abandoned without operating the voice recognition thereto.

In an embodiment of the invention, the voiceprint identification flow is implemented by using an operational method of Mel-Frequency Cepstral Coefficients (MFCCs).

The invention provides an electronic device for using voiceprint identification to operate voice recognition, which includes a transceiver module and a control module. The transceiver module receives a specific voice fragment. The control module is coupled to the transceiver module, and configured to: cut the received specific voice fragment into a plurality of specific sub-voice clips; perform a voiceprint identification flow to the specific sub-voice clips, respectively; determine whether each of the specific sub-voice clips is an appropriate sub-voice clip according to a result of performing the voiceprint identification flow to the sub-voice clips. Next, the appropriate sub-voice clips are captured and the voice recognition is operated thereto.

In summary, the invention provides a method for using voiceprint identification to operate voice recognition and an electronic device thereof. Before the voice recognition is operated, it is determined through the voiceprint identification flow that, whether one or more sub-voice clips among the voice fragment received by the transceiver module after being cut are the appropriate sub-voice clips. The appropriate sub-voice clips are captured and the voice recognition is operated thereto. Accordingly, the correctness of the voice recognition can be increased due to less of recognition error caused by interference from other noises.

To make the above features and advantages of the disclosure more comprehensible, several embodiments accompanied with drawings are described in detail as follows.

DESCRIPTION OF THE EMBODIMENTS

Figure 1:
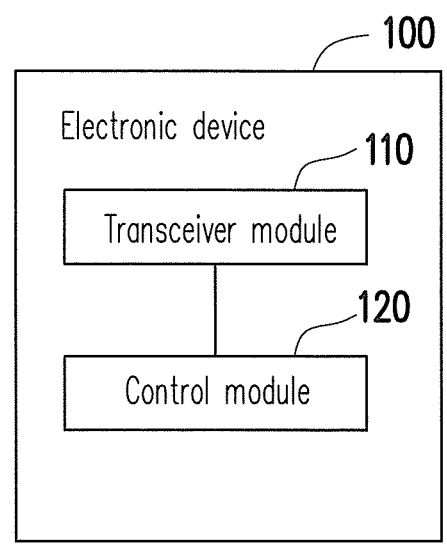
FIG. 1 is a schematic diagram of an electronic device according to an embodiment of the invention.

FIG. 1 is a schematic diagram of an electronic device 100 according to an embodiment of the invention, and the electronic device 100 is utilized to implement a method for using voiceprint identification to operate voice recognition according to the invention. The electronic device 100 includes a transceiver module 110 and a control module 120, which are coupled to each other. Therein, the transceiver module 110 can be a combination of audio sensing components (e.g., microphones and audio detectors) and broadcast components (e.g., speaker and amplifiers). The control module 120 can be a functional module implemented by hardware and/or software, in which the hardware can be a hardware apparatus with computing capability such as a CPU, a chip set, a microprocessor, or a combination of the above; and the software can be an operating system or a driver and so on. The control module 120 is a master control element provided for using voiceprint identification to operate voice recognition of the invention.

Figure 2:
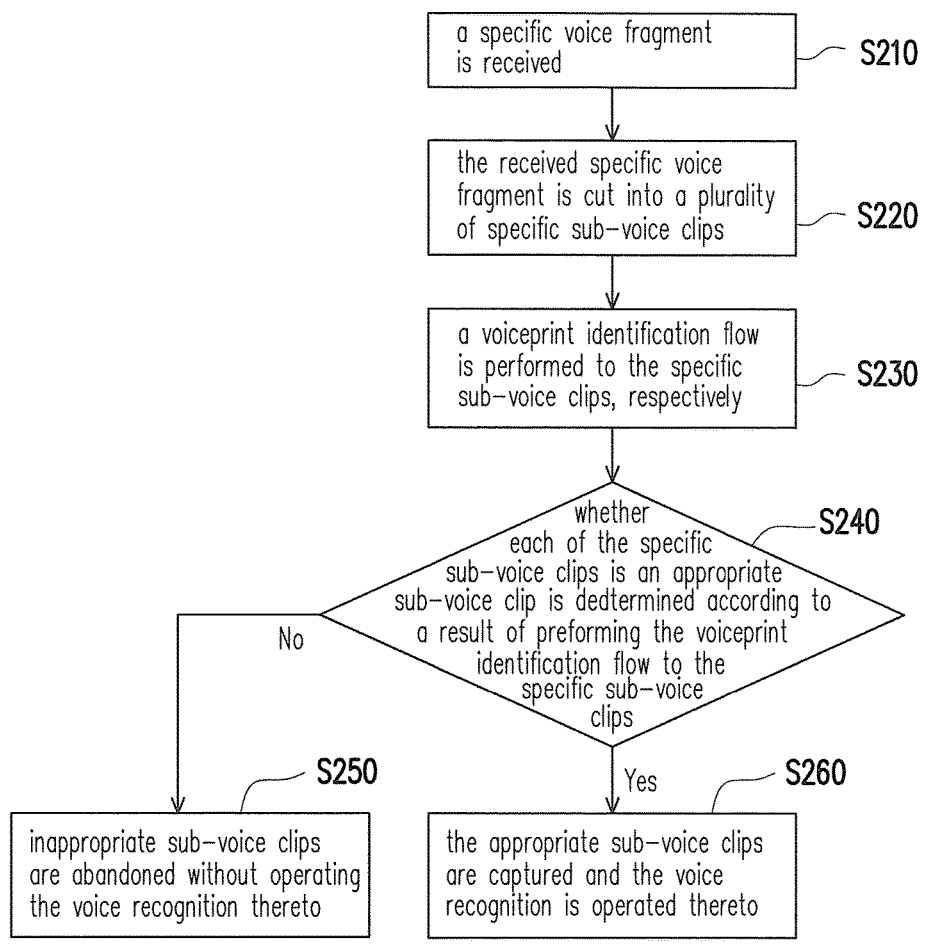
FIG. 2 is a flowchart of a method for using voiceprint identification to operate voice recognition according to an embodiment of the invention.

FIG. 2 is a flowchart of a method for using voiceprint identification to operate voice recognition according to an embodiment of the invention. Referring to FIGS. 1 and 2 together. First, the transceiver module 110 receives a specific voice fragment (step S210). The control module 120 cuts the specific voice fragment received by the transceiver module 110 into a plurality of specific sub-voice clips (step S220). Next, a voiceprint identification flow is performed to the specific sub-voice clips, respectively (step S230). Therein, the voiceprint identification flow is implemented by using an operational method of Mel-Frequency Cepstral Coefficients. For speech identification and voiceprint recognition, one of the most used voice characteristics is Mel-Frequency Cepstral Coefficients. This parameter is designed in consideration of perceptions for different frequencies, thus it is particularly suitable for speech identification or voiceprint recognition. Mel-Frequency Cepstral Coefficients are calculated by converting a time domain signal into a frequency domain signal by using a Fast Fourier Transform (FFT). Next, a convolution is performed on its logarithmic energy spectrum by using triangular filters distributed according to Mel scale. Lastly, a discrete cosine transform is performed on a vector composed of each output of the filters, so as to obtain a result.

After step S230, the control module 120 determines whether each of the specific sub-voice clips is an appropriate sub-voice clip according to a result of performing the voiceprint identification flow to the specific sub-voice clips (step S240). When the determination in step S240 is no, the control module 120 abandons inappropriate sub-voice clips without operating the voice recognition thereto (step S250). When the determination in step S240 is yes, the control module 120 captures the appropriate sub-voice clips and the voice recognition is operated thereto (step S260).

Figure 3:
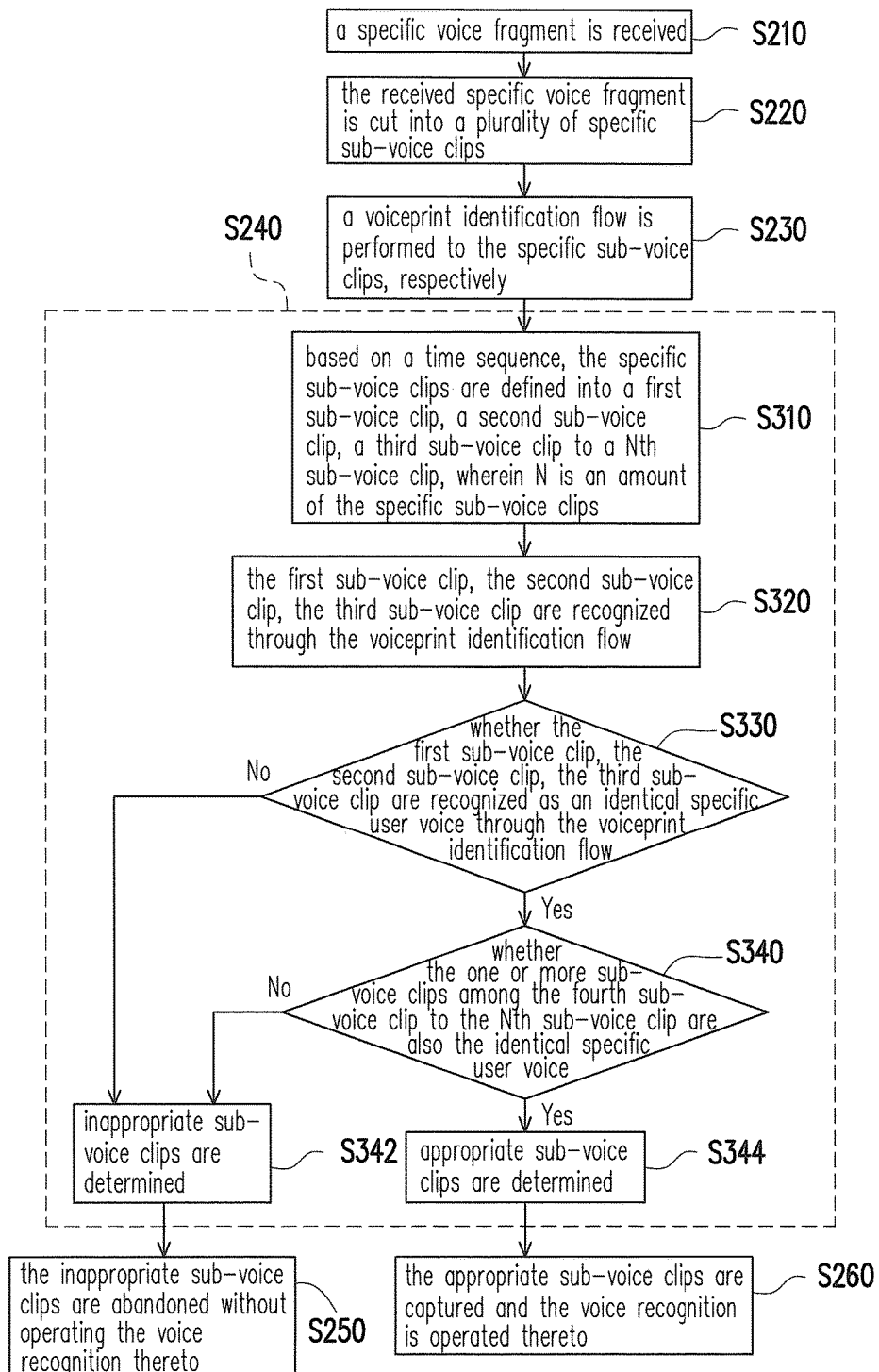
FIG. 3 is a flowchart of another method for using voiceprint identification to operate voice recognition according to the embodiment of FIG. 1.

FIG. 3 is a flowchart of a method for using voiceprint identification to operate voice recognition according to another embodiment of the invention. Referring to FIG. 1 and FIG. 3 together. Steps S210 to S230 depicted in FIG. 3 are identical to the processes depicted in FIG. 2, thus relation description is omitted herein. Step S240 as disclosed in FIG. 2, in which the control module 120 determines whether each of the specific sub-voice clips is the appropriate sub-voice clip according to the result of performing the voiceprint identification flow, is further divided into steps S310 to S344 depicted in the embodiment of FIG. 3 and described hereinafter. In the embodiment of FIG. 3, after step S230 in which the voiceprint identification flow is performed to the specific sub-voice clips, respectively, based on a time sequence, the specific sub-voice clips are defined into a first sub-voice clip, a second sub-voice clip and a third sub-voice clip to a Nth sub-voice clip, wherein N is an amount of the specific sub-voice clips (step S310).

Next, the first sub-voice clip, the second sub-voice clip and the third sub-voice clip are recognized through the voiceprint identification flow (step S320). Then, whether the first sub-voice clip, the second sub-voice clip, and the third sub-voice clip are recognized as an identical specific user voice through the voiceprint identification flow is determined (step S330). In other words, it is determined whether the first sub-voice clip, the second sub-voice clip, and the third sub-voice clip are vocalized by the same user. When the determination in step S330 is no, they are deemed as inappropriate sub-voice clips (step S342). When the determination in step S330 is yes, proceeding to step S340 in which whether the one or more sub-voice clips among the fourth sub-voice clip to the Nth sub-voice clip are also the identical specific user voice is determined (step S340) When the determination in step S340 is no, the one or more sub-voice clips not being the identical specific user voice are the inappropriate sub-voice clips (S342). When the determination in step S340 is yes, the one or more sub-voice clips being the identical specific user voice are the appropriate sub-voice clips (S344). After step S342, the inappropriate sub-voice clips are abandoned without operating the voice recognition thereto (step S250). After step S344, the appropriate sub-voice clips are captured and the voice recognition is operated thereto (step S260).

Figure 4A:
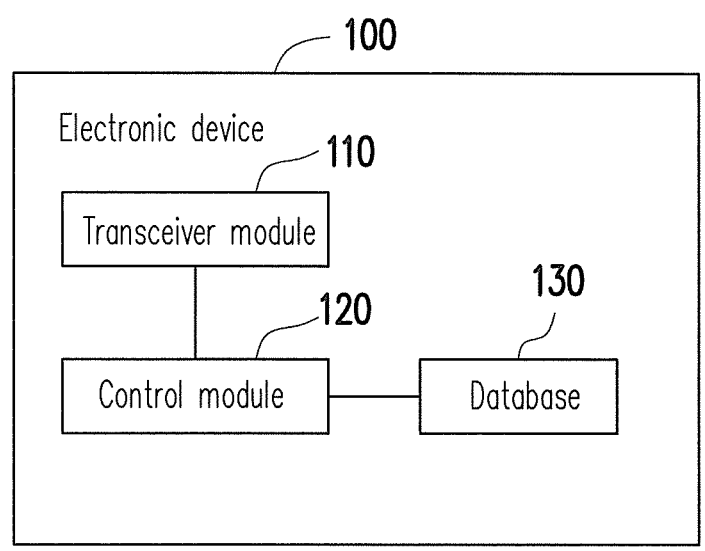
FIG. 4A is a schematic diagram of an electronic device according to another embodiment of the invention.
Figure 4B:
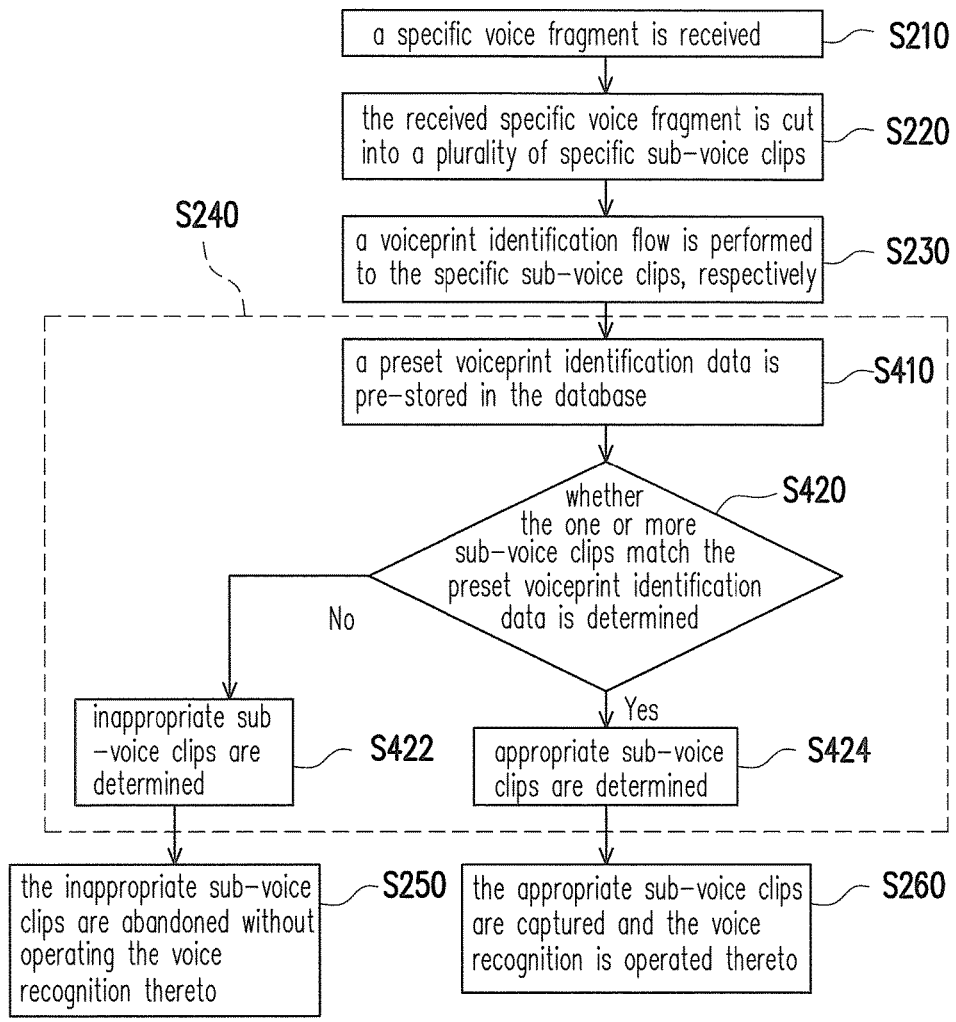
FIG. 4B is a flowchart of a method for using voiceprint identification to operate voice recognition according to the embodiment of FIG. 4A.

FIG. 4A is a schematic diagram of an electronic device according to another embodiment of the invention. FIG. 4B is a flowchart of a method for using voiceprint identification to operate voice recognition according to the embodiment of FIG. 4A. Referring to FIG. 4A and FIG. 4B together. A difference between the functional block diagram of FIG. 4A and that of the embodiment of FIG. 1 is that, a database 130 is coupled to the control module 120 in FIG. 4A, and the database 130 is pre-stored with a preset voiceprint identification data. Steps S210 to S230 depicted in FIG. 4B are identical to the processes depicted in FIG. 2, thus relation description is omitted herein. Step S240 as disclosed in FIG. 2, in which the control module 120 determines whether each of the specific sub-voice clips is an appropriate sub-voice clip according to the result of performing the voiceprint identification flow, is further divided into steps S410 to S424 depicted in the embodiment of FIG. 4B and described hereinafter. In the embodiment of FIG. 4B, the preset voiceprint identification data is pre-stored in the database 130 (step S410). Next, the control module 120 determines whether the one or more sub-voice clips match the preset voiceprint identification data (step S420). When the determination in step S420 is no, the one or more sub-voice clips mismatching the preset voiceprint identification data are the inappropriate sub-voice clips (S422). When the determination in step S420 is yes, the one or more sub-voice clips matching the preset voiceprint identification data are the appropriate sub-voice clips (S424). After step S422, the inappropriate sub-voice clips are abandoned without performing the voice recognition thereto (step S250). After step S424, the appropriate sub-voice clips are captured and the voice recognition is operated thereto (step S260).

In summary, the invention provides a method for using voiceprint identification to operate voice recognition and an electronic device thereof. Before the voice recognition is operated, it is determined through the voiceprint identification flow that, whether one or more sub-voice clips among the voice fragment received by the transceiver module after being cut are the appropriate sub-voice clips. The appropriate sub-voice clips are captured and the voice recognition is operated thereto. By using determining processes provided in the invention, the human machine interface for interchanging voices is capable of capturing the voice conversation fragments that are truly vocalized by the user. Accordingly, the correctness of the voice recognition can be significantly increased due to the recognition error caused by the interference from other voices or other noises being lowered.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for using voiceprint identification to operate voice recognition, comprising:
    receiving a specific voice fragment;
    cutting the specific voice fragment into a plurality of specific sub-voice clips;
    identifying a voiceprint of each of the specific sub-voice clips according to a discrete cosine transform of a logarithmic energy spectrum of each of the plurality of the specific sub-voice clips;
    when first three of the plurality of the specific sub-voice clips in a time sequence are recognized as not belonging to an identical specific user voice according to identified voiceprints, not operating voice recognition of the plurality of the specific sub-voice clips;
    when first three of the plurality of the specific sub-voice clips in the time sequence are recognized as belonging to the identical specific user voice according to identified voiceprints, and none of the rest of the plurality of the specific sub-voice clips in the time sequence is recognized as belonging to the identical specific user voice according to identified voiceprints, not operating voice recognition of the plurality of the specific sub-voice clips;
    when first three of the plurality of the specific sub-voice clips in the time sequence are recognized as belonging to the identical specific user voice according to identified voiceprints, and at least one of the rest of the plurality of the specific sub-voice clips in the time sequence is recognized as belonging to the identical specific user voice according to identified voiceprints, operating voice recognition of the all of the plurality of the specific sub-voice clips that are recognized as belonging to the identical specific user voice.

2. The method of claim 1, further comprising:
    storing a preset voiceprint identification data in a database; and
    when it is determined that the one or more of the specific sub-voice clips among the specific sub-voice clips match the preset voiceprint identification data, operating voice recognition of the one or more of the specific sub-voice clips matching the preset voiceprint identification data.

3. The method of claim 2, further comprising:
    when it is determined that the one or more of the specific sub-voice clips among the specific sub-voice clips mismatch the preset voiceprint identification data, not operating voice recognition of the one or more of the specific sub-voice clips mismatching the preset voiceprint identification data.

4. An electronic apparatus, comprising:
    a transceiver module to receive a specific voice fragment; and
    a control module coupled to the transceiver module, and configured to:
    cut the specific voice fragment into a plurality of specific sub-voice clips;
    identify a voiceprint of each of the specific sub-voice clips according to a discrete cosine transform of a logarithmic energy spectrum of each of the plurality of the specific sub-voice clips;
    when first three of the plurality of the specific sub-voice clips in a time sequence are recognized as not belonging to an identical specific user voice according to identified voiceprints, not operate voice recognition of the plurality of the specific sub-voice clips;
    when first three of the plurality of the specific sub-voice clips in the time sequence are recognized as belonging to the identical specific user voice according to identified voiceprints, and none of the rest of the plurality of the specific sub-voice clips in the time sequence is recognized as belonging to the identical specific user voice according to identified voiceprints, not operate voice recognition of the plurality of the specific sub-voice clips;
    when first three of the plurality of the specific sub-voice clips in the time sequence are recognized as belonging to the identical specific user voice according to identified voiceprints, and at least one of the rest of the plurality of the specific sub-voice clips in the time sequence is recognized as belonging to the identical specific user voice according to identified voiceprints, operate voice recognition of the all of the plurality of the specific sub-voice clips that are recognized as belonging to the identical specific user voice.

5. The electronic device of claim 4, further comprising:
    a database coupled to the control module, and configured to pre-store a preset voiceprint identification data; when it is determined that the one or more of the specific sub-voice clips among the specific sub-voice clips match the preset voiceprint identification data, the control module operates voice recognition of the one or more of the specific sub-voice clips matching the preset voiceprint identification data.

6. The electronic device of claim 5, further comprising:
    when it is determined that the one or more of the specific sub-voice clips among the specific sub-voice clips mismatch the preset voiceprint identification data, the control module does not operate voice recognition of the one or more of the specific sub-voice clips mismatching the preset voiceprint identification data.

\* \* \* \* \*